United States Patent [19]

Epmeier

[11] 4,130,932
[45] Dec. 26, 1978

[54] METHOD OF JOINING A TUBE TO A PLATE

[75] Inventor: Robert T. Epmeier, Evansville, Ind.

[73] Assignee: Arkla Industries, Inc., Evansville, Ind.

[21] Appl. No.: 630,896

[22] Filed: Nov. 11, 1975

[51] Int. Cl.$^2$ .................. B21D 39/08; B23P 11/02
[52] U.S. Cl. ................................ 29/523; 29/243.52;
                                          285/382.5; 403/284
[58] Field of Search ............................. 29/523, 243.52;
                                          285/382.4, 382.5; 403/284

[56] References Cited

U.S. PATENT DOCUMENTS

| | | | |
|---|---|---|---|
| 1,447,520 | 3/1923 | Schade | 29/523 UX |
| 3,140,540 | 7/1954 | Greenman | 29/523 X |
| 3,279,051 | 10/1966 | Minshall | 29/523 X |
| 3,280,454 | 10/1966 | Rich et al. | 29/243.52 |
| 3,778,090 | 12/1973 | Tobin | 29/523 X |

Primary Examiner—Charlie T. Moon
Attorney, Agent, or Firm—Cushman, Darby & Cushman

[57] ABSTRACT

One end of a metal tube is joined tightly to a plate by locating the end portion loosely within an aperture in the plate and, in a single pressing operation, expanding the tube wall into engagement with the periphery of the wall of the aperture, buckling the tube wall to form a double-walled flange or collar against the side of the plate opposite the free end of the tube and crimping the free end of the tube radially outward to form a flange against the other side of the plate. Apparatus for carrying out the method includes a device for clamping the tube from the sides and a die which enters the free end of the tube for carrying out the expanding, buckling and crimping steps.

3 Claims, 6 Drawing Figures

METHOD OF JOINING A TUBE TO A PLATE

This invention relates to a method and apparatus for tightly joining a metal tube end to the wall of an aperture in a plate by deformation of the tube end. In particular it relates to a method and apparatus in which the tube end is first expanded while in the aperture and thereafter the tube wall is crimped against both sides of the plate.

BACKGROUND

In many situations it is desirable to permanently attach a tube to a plate through an aperture therein and various crimping or swaging procedures have been proposed to complete such a mounting operation. The U.S. Pat. Nos. 3,119,435 and 3,140,540 to Greenman show examples of one known method and apparatus for expanding the ends of tubes to join them permanently to a web or plate means or the like. In Greenman, the end of the tube is first performed in one operation to have a collar near its end and then in a second step the tube and plate means are assembled while the ultimate end of the tube is then deformed to complete the attachment of the tube to the apertured element.

Another U.S. Pat. No. 3,778,090 to Tobin, shows alternate methods using either a two or three step crimping process for connecting a tube with a so-called tube block. As here shown, in one method a cooperative die set is used to form an initial bead in the tube together with additional extruded antirotational splines and thereafter one of the elements of the first die set is removed and a second die means is used to crimp an O ring seal in place between the tube and its tube block. In the alternate method, two additional die means are used to complete the swaging of the end of the Tobin tube.

The U.S. Pat. No. 3,280,454 to Rich et al. shows a machine for attaching rungs in the side channels of a ladder wherein one of the side rails of a ladder is carried on very stiff springs while an outer flange is formed on the extending free end of a tube that serves as a rung of the ladder and then an inner flange is formed on the same rung on the other side of the web side channel after the back pressure of the springs has been overcome. In this procedure, the male die element and the female die coact to produce the flanges while the aperture in the web of the side rail of the ladder serves as a divider to guide the location of wrinkling of the tube whereby to form the flanges.

Other less pertinent prior art disclosures showing more complicated procedures to reach somewhat the same end result are seen in U.S. Pat. Nos. 866,644 to Green, 2,535,403 to Froggatt and 3,766,631 to Scheitlin et al.

BRIEF DESCRIPTION OF THE INVENTION

The present invention contemplates a method and apparatus in which a tube end, after being disposed in an aperture in a plate or the like with the end projecting from the plate, is joined to the plate by first radially expanding the tube wall into engagement with the wall of the aperture and then deforming the tube wall to form two annular flanges disposed on opposite faces of the plate. The method is preferably carried out in a single continuous operation in which the initial radial expansion of the tube is effected by relative axial movement between the tube and an inner die disposed in the bore of the tube, thereby locking the tube to the plate, whereupon continued relative movement in the same direction, in conjunction with an outer die clamped to the tube, effects formation of the flanges.

More specifically the preferred technique involves first positioning the tube in an outer die in a manner such that the free end of the tube projects out of the outer die and such that no relative axial movement takes place between the tube and the outer die. Either before or after this operation the plate is fitted loosely over the free end of the tube and is releasably supported in a position such that the free end of the tube projects outwardly a predetermined distance from one face of the plate. The assembly of outer die, tube and plate is disposed in alignment with the inner die which has a body complementary to and easily slidable within the bore of the tube and a second portion, such as a shoulder, of slightly enlarged cross sectional area.

Upon relative movement of the inner die and the tube toward each other in an axial direction the body of the inner die moves into the bore of the tube with any effect on the tube. As the enlarged portion contacts the free end of the tube and is forced into the bore, the tube wall is expanded or swaged outwardly. When the enlarged portion of the die reaches the location of the plate the expanding tube wall tightly engages and becomes frictionally locked to the wall of the aperture in the plate. The inner die does not pass through the aperture; instead continued relative movement results in an axial force being applied to the tube at the location of the plate. It will be understood that the relative dimensions of the aperture in the plate, the outside diameter of the tube and the diameter of the enlarged portion of the inner die are selected to effect the result just described. That is, the difference between the outside diameter of the tube and the diameter of the aperture must be small enough that the expansion of the tube wall by the enlarged portion of the inner die will frictionally lock the tube to the plate. And the diameter of the enlarged portion of the inner die must be large enough to cause the necessary expansion yet small enough not to jam against the free end of the tube and thereby create excessive axial force which might deform the tube in an undesired manner. For example, for a tube wall thickness of 1/32 inch and 0.005 inch clearance between the body of the inner die and between the tube and the wall of the aperture in the plate, an increase in diameter of 0.02 inch from the body to the enlarged portion of the inner die is suitable.

As described above continued relative axial movement between the tube and the inner die, after the friction locking of the tube to the plate, generates an axial force which is applied to the tube at the location of the friction connection to the plate. At the same time the tube is prevented from moving axially relative to the outer die, and the outer die together with the body of the inner die support the tube wall outside and inside. The end portion of tube projecting out of the outer die is not supported exteriorly and as a result the axial force on the tube causes the tube to buckle or fold outwardly thereby forming a double-walled annular flange or collar between the outer die and the surface of the plate facing the outer die. The distance between the plate and the outer die in the initial arrangement determines the radial width of the flange, since all of the tube wall between the plate and the outer wall will be deformed during this stage of the process.

When the double-walled flange has been pressed tightly against the surface of the plate continued axial movement between the inner die and the tube generates a still higher axial force on the tube at the location of the friction connection between the tube and the plate. This higher force is sufficient to effect slight axial movement between the inner die and the tube such that the free end of the tube is now engaged by a shoulder on the inner die. Further relative movement causes this shoulder to crimp or fold the free end portion of the tube into an annular flange which tightly engages the surface of the plate nearest the free end of the tube. The length of tube which projects outwardly from the plate in the initial arrangement determines the annular width of this flange.

With respect to the apparatus the preferred arrangement includes a vertically movable inner die and a stationary outer die, the latter being formed of two or more parts which are movable toward and away from each other in directions radial with respect to the axis of the tube. The lower die parts are mounted on a fixed horizontal base which serves as a support for the end of the tube.

IN THE DRAWINGS

DETAILED DESCRIPTION

Figure 1:
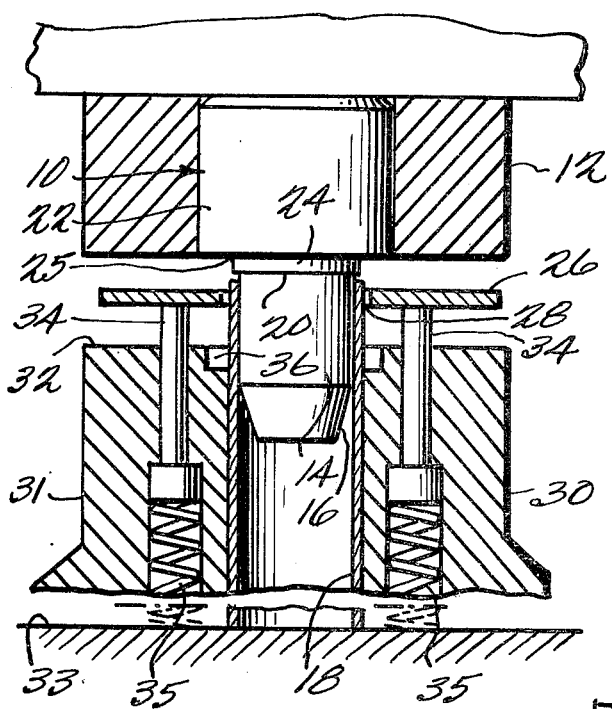
FIG. 1 is a diagrammatic vertical sectional view of an apparatus embodying the principles of the present invention, showing an inner die at the beginning of a joining operation.

The apparatus illustrated in the drawing includes an inner die 10 carried by a head 12 which is driven vertically by suitable mechanical or hydraulic means (not shown). The inner die 10 has a cylindrical body 14 terminating in a tapered lower end 16, the diameter of the body 14 being slightly less (e.g. 0.005 inch) than the inside diameter of the tube 18. Above the body 14 the die 10 has an enlarged cross section forming a shoulder 20 which has a diameter slightly greater (e.g. 0.005 inch) than the inside of the tube 18.

Figure 5:
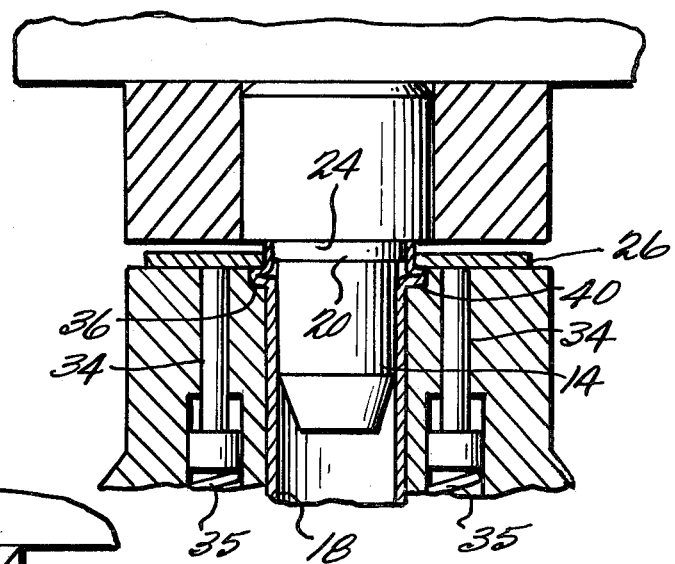
Figure 6:
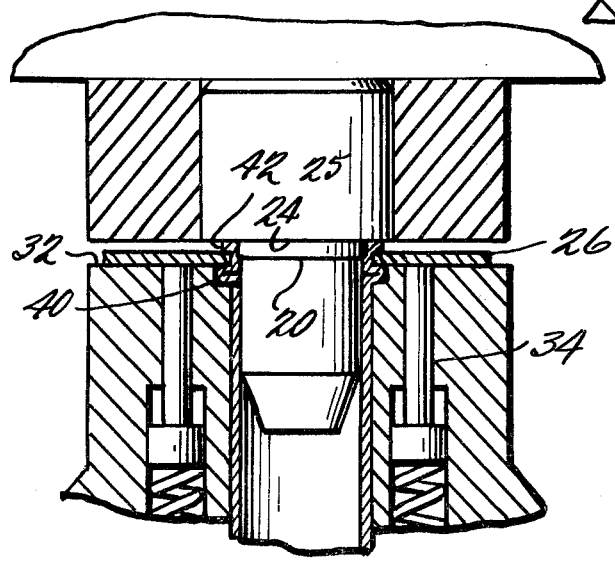
FIG. 6 is a vertical sectional view showing the final swaging of the end of the tube to form a flange on the other side of the plate.

The inner die 10 is supported in a vertically reciprocating driving head 12 by an enlarged, preferably cylindrical, mounting element 22 that forms a shoulder 24 adapted to butt against the end of the tube 18 in the final swaging operations as shown in FIGS. 5 and 6. The junction 25 between the shoulder 24 and the body 14 is concave, rather than sharply angled. A radius of curvature of, for example, 0.001 inch is appropriate.

The tube 18 is adapted to be joined to a plate 26 and for this purpose the plate 26 is provided with an aperture 28 through which the end of the tube 18 extends with a loose fit. An outer clamping die assembly 30, 31 is positioned below the inner die for holding the tube 18 rigidly in place in axial alignment with the reciprocably driven inner die 10. The outer die parts 30 and 31 are slidably mounted on a fixed base plate 33 for movement toward and away from each other, and means (not shown) are provided for clamping them together so as to hold the tube 18. The upper end of the tube 18 extends above the upper face 32 of the die parts 30, 31, and the plate 26 is supported in a position spaced parallel to and above the face 32 by means of vertically movable support pins 34 having enlarged lower ends carried on spiral springs 35 to allow the plate to move downwardly during the swaging operations as will be seen more fully below. The face 32 of the die parts 30, 31 has an upwardly facing and open undercut ring 36 formed therein surrounding the aperture through which the clamped tube 18 extends.

In operation of the apparatus the inner die 10 is raised to a fully up position (not shown) and the outer die parts 30, 31 are moved apart. The tube 18 is inserted loosely between the die parts 30, 31 the lower end of the tube 18 resting on the base plate 33 and the upper end projecting above the die parts 30, 31. The plate 26 is placed over the exposed end of the tube 18 and is supported in this position by the pins 34 and the springs 35.

The outer die parts 30, 31 are now moved together to clamp the tube 18 in axial alignment with the tube 18 and the inner die 10 moves downwardly so that the die body 14 enters the tube without causing any distortion thereof. This is the position illustrated in FIG. 1 in which it will be seen that the shoulder 20 on the inner die 10 is still above the tube 18.

Figure 2:
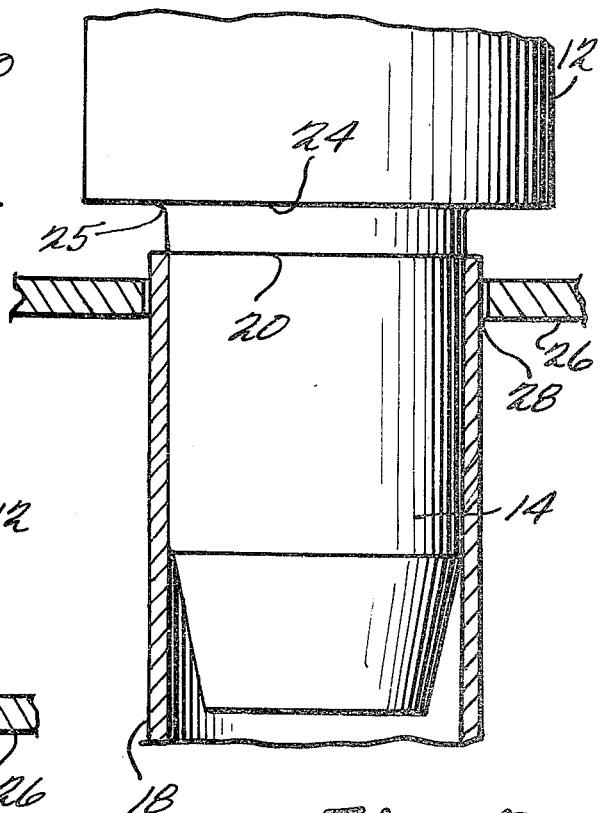
FIG. 2 is a sectional view on an enlarged scale showing the inner side elevation enlarged to die about to expand the end of the extended tube portion.
Figure 3:
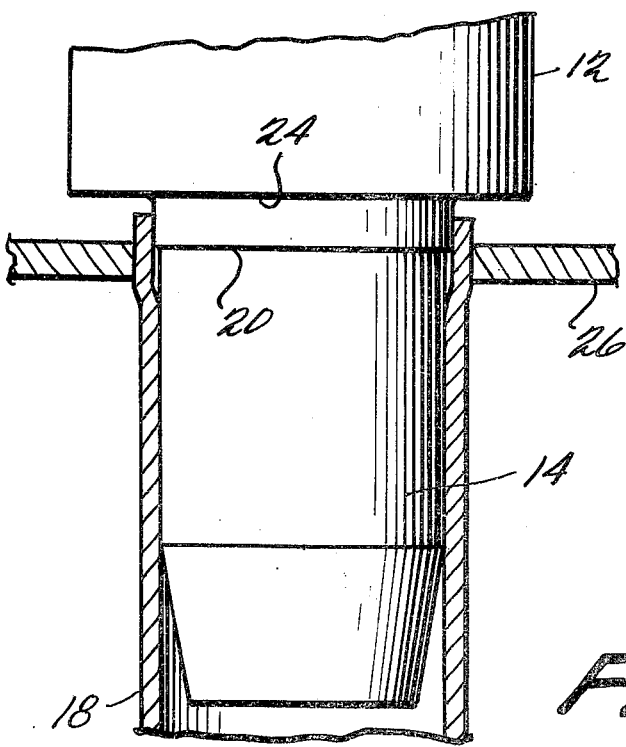
FIG. 3 is a view similar to FIG. 2 showing the inner die causing expansion of the tube end.

As the shoulder 20 engages and enters the tube 18, as illustrated in FIGS. 2 and 3, the wall of the tube is expanded into tight engagement with the wall of the aperture 28 in the plate 26. The axial compressive force exerted by the inner die 10 on the tube 18 at this stage is resisted by the tube wall.

Figure 4:
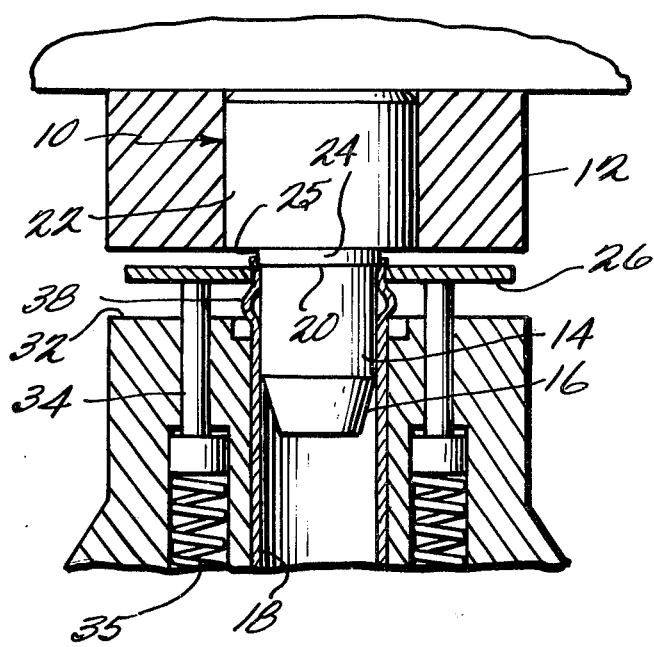
FIGS. 4 and 5 are vertical sectional views showing, respectively, the beginning and end of the crimping step for forming a collar on the tube on one side of the plate.

The shoulder 20 does not pass through the aperture 28 in the plate 28 at this time. Rather, when the tube wall becomes locked to the wall of the aperture (FIG. 3) continued movement of the inner die 10 produces a higher axial compressive force on the tube 18 such that the tube wall between the plate 26 and the die 30, 31 begins to buckle or bulge, as shown at 38 in FIG. 4. As a result the upper end of the tube 18 and the plate 26, which is now frictionally connected to the tube 18, move downwardly against the springs 35 and toward the FIG. 5 position. In this position the buckled tube wall has been compressed between the plate 26 and the ring portion 36 of the outer die 30, 31 so as to form a double-walled annular flange 40. The plate 26 now rests on the upper face 32 on the outer die 30, 31. It will be appreciated that the outward bulging of the tube wall is induced in part by the fact that the tube wall is supported interiorly by the die body 14 and exteriorly at the locations of the plate 26 and the outer die 30, 31.

Either simultaneous with or just subsequent to the formation of the flange 40 the die 10 generates a still higher axial force on the tube 18 so that the lower shoulder 20 moves slightly downward relative to the tube 18 and so that the upper shoulder 24 engages the end of the tube (FIG. 5). The diameter of the lower shoulder 20 is slightly greater than the diameter of the aperture 28 in the plate 26 less twice the initial wall thickness of the tube 18. This relationship achieves the friction locking of the tube 18 to the plate 26 (FIG. 3) and it also permits the necessary subsequent axial movement of the die 10 relative to the end of the tube when the axial force on the tube becomes greater near the end of the travel of the die 10 (FIG. 5). Actually a small amount of metal will be shaved from the bore of the tube 18 by the shoulder 20 as the latter is forced from its FIG. 4 position to its FIG. 5 position. No deformation of the plate 26 occurs during this or any other operation, however.

FIG. 6 illustrates the last step in the deforming operation. As the upper shoulder 24 engages the upper end of the tube 18, as shown in FIG. 5, a still greater axial compressive force is applied to the tube 18. This force is sufficient to cause that part of the tube 18 between the plate 26 and the upper shoulder 24 to be folded outwardly so as to form an annular flange 42, as shown in FIG. 6. The curved junction 25 aids in initiating the outward movement of the tube end. Since the outer die 30, 31 is fixed against vertical movement, the plate 26 becomes tightly and permanently clamped between the flanges 40 and 42. The inner die 10 is raised and the die parts 30 and 31 are moved apart so that the unitary assembly of the tube 18 and the plate 26 can be removed. The joint between the tube 18 and the wall of the aperture in the plate 26 is extremely strong mechanically and is gastight.

The sequence of steps described above takes place automatically during a single uninterrupted downward stroke of the inner die 10. That is, the die 10 is not controlled in a stepwise manner. Rather, downward pressure is continuously applied to the die 10 and the deforming operations follow automatically as a result of the size and position relationships among the parts. It will be noted that the distance between the die shoulder 24 and the end of the tube 18 determines the width of the flange 42 and that the initial distance between the plate 26 and the die face 32 determines the width of the flange 40. This latter distance is established by the pins 34 and the springs 35. The depth of the undercut ring 36 in the die face 32 should be about equal to twice the wall thickness of the tube, in order to ensure that the walls of the flange 40 become pressed together yet not unduly distorted. The diameter of the die shoulder 20 must exceed the inside diameter of the tube 18 and also must not be so great as to prevent movement of the shoulder 20 from the FIG. 4 position to the FIG. 5 position.

I claim:

1. A method for joining a tube to a plate comprising: inserting the tube through a walled aperture in the plate so that an end portion of the tube extends beyond one side of the plate and so that the body of the tube extends beyond the other side of the plate; clamping a portion of the tube body in an outer die; axially aligning with the tube an inner die having a body the cross section of which is less than the cross section of the bore of the tube and having a shoulder the cross section of which is greater than the cross section of the bore of the tube; effecting relative movement between said inner and outer dies toward each other whereby the inner die body enters the tube and whereby the shoulder on the inner die engages the wall of the tube and transmits axial and radial force thereto so as to in sequence radially expand the wall of the tube into tight engagement with the wall of the aperture, move said end portion and body of the tube toward each other to buckle the tube wall adjacent said other side of the plate thereby forming a double-walled annular flange which engages said other side of the plate, and fold said end portion of the tube radially outwardly to form an annular flange engaging said one side of the plate.

2. A method as in claim 1 wherein during formation of the double-walled flange the plate engages the outer die.

3. A method using inner and outer dies to swage a tube to attach it to a plate having a walled aperture therein in order to join the parts together, comprising: fitting the tube in said aperture in the plate to which it is to be joined with an exposed end of the tube extending a predetermined distance beyond one side of the plate; fixedly engaging the outside of the tube that extends beyond the other side of the plate in the outer die means; holding the plate spaced from the outer die; and effecting a single continuous movement of one of the dies toward the other thereby in sequence (1) driving the inner die axially into the tube, the inner die having a first shoulder thereon that is adapted to frictionally engage in the exposed end of the tube with the driving force being sufficient to radially expand the tube to tightly engage the wall of said aperture (2) buckling the tube outwardly between the outer die and the plate so as to form a collar on the tube and (3) driving the inner die further into the tube, said inner die having a second shoulder which engages the exposed end of the tube to form an outwardly directed flange on the exposed end of the tube on said one side of the plate whereby said collar and flange join the tube and plate together.

* * * * *